United States Patent [19]

Sylvestre

[11] Patent Number: 5,154,600
[45] Date of Patent: Oct. 13, 1992

[54] ILLUMINATION KIT APPARATUS

[76] Inventor: Paul J. Sylvestre, 1475 Croissant de la Salle, Laval Quebec, Canada, H7G4E7

[21] Appl. No.: 783,526
[22] Filed: Oct. 28, 1991
[51] Int. Cl.$^5$ .................... F23D 21/00; F21V 33/00
[52] U.S. Cl. ................... 431/253; 431/288; 431/289; 362/84; 362/154; 362/161; 362/253; 206/573; 206/803
[58] Field of Search ............ 431/431, 288, 289, 253, 431/295, 125, 126; 362/84, 34, 234, 253, 154, 161, 810; 206/570, 573, 803; 312/7.1

[56] References Cited
U.S. PATENT DOCUMENTS

| 19,158 | 1/1858 | Shantes ............................... 362/154 |
| 531,467 | 12/1989 | Nittinger, Sr. ..................... 431/253 |
| 1,032,610 | 7/1912 | Kern ................................. 362/34 X |
| 1,342,778 | 6/1920 | Thorne ............................. 362/34 X |
| 2,220,407 | 11/1940 | Joss ................................. 431/253 X |
| 2,671,623 | 3/1954 | Toulmins, Jr. ................... 206/803 X |
| 3,371,771 | 3/1968 | Bogyi .............................. 206/803 X |
| 3,706,523 | 12/1972 | Kumm ............................. 431/288 X |
| 3,796,869 | 3/1974 | Stones ................................. 362/84 |
| 5,053,930 | 10/1991 | Benavides ....................... 362/84 X |

FOREIGN PATENT DOCUMENTS 127417  6/1919  United Kingdom ................. 362/84

Primary Examiner—Carl D. Price
Attorney, Agent, or Firm—Leon Gilden

[57] ABSTRACT

An illumination kit includes at least one candle member, wherein the candle member is formed with a plurality of circumferential luminescent bands circumferentially mounted to a side wall of the candle, with the candle mounted to a base permitting its transport and repositioning. The kit further includes a flashlight and radio receiver mounted relative to the base for use during emergency conditions.

7 Claims, 4 Drawing Sheets 5,154,600

ILLUMINATION KIT APPARATUS

BACKGROUND OF THE INVENTION

1. Field of the Invention

The field of invention relates to emergency kit apparatus, and more particularly pertains to a new and improved illumination kit apparatus wherein the same is arranged to provide for emergency illumination during periods of electrical failure.

2. Description of the Prior Art

Power outages are a frequent and commonplace occurrence in contemporary society due to conditions of weather, mechanical failure, and the like. During such conditions, as well as in camping and traveling, use of emergency power is required. Such emergency power may be in the form of battery operated components, generator operated components, and candle power. Various examples of candle power structure are available in the prior art and exemplified in U.S. Pat. No. 4,755,135 to Kwok wherein a candle device includes a biasing spring to maintain a candle in an upwardly biased orientation relative to a surrounding support.

U.S. Pat. No. 4,926,298 to Zimmerman sets forth a candle lamp mounting a candle therewithin for illumination purposes.

U.S. Pat. No. 4,797,090 to Rogers sets forth a candle latern wherein the candle flames have substantially a continuous elevation.

U.S. Pat. No. 4,917,597 to Henze sets forth a wax candle including a wax with a melting point between b 52 degrees C. and 56 degrees C., including a jacket formed of a further wax material of an elevated melting temperature.

As such, it may be appreciated that there continues to be a need for a new and improved illumination kit apparatus as set forth by the instant invention which addresses both the problems of ease of use as well as effectiveness in construction in providing emergency candle power for illumination purposes and in this respect, the present invention substantially fulfills this need.

SUMMARY OF THE INVENTION

In view of the foregoing disadvantages inherent in the known types of candle apparatus now present in the prior art, the present invention provides an illumination kit apparatus wherein the same is arranged to provide for emergency illumination and attending components for use in conditions of unexpected electrical power shortages. As such, the general purpose of the present invention, which will be described subsequently in greater detail, is to provide a new and improved illumination kit apparatus which has all the advantages of the prior art candle apparatus and none of the disadvantages.

To attain this, the present invention provides an illumination kit including at least one candle member, wherein the candle member is formed with a plurality of circumferential luminescent bands circumferentially mounted to a side wall of the candle, with the candle mounted to a base permitting its transport and repositioning. The kit further includes a flashlight and radio receiver mounted relative to the base for use during emergency conditions.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the Public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims nor is it intended to be limiting as to the scope of the invention in any way.

It is therefore an object of the present invention to provide a new and improved illumination kit apparatus which has all the advantages of the prior art candle apparatus and none of the disadvantages.

It is another object of the present invention to provide a new and improved illumination kit apparatus which may be easily and efficiently manufactured and marketed.

It is a further object of the present invention to provide a new and improved illumination kit apparatus which is of a durable and reliable construction.

An even further object of the present invention is to provide a new and improved illumination kit apparatus which is susceptible of a low cost of manufacture with regard to both materials and labor, and which accordingly is then susceptible of low prices of sale to the consuming public, thereby making such illumination kit apparatus economically available to the buying public.

Still yet another object of the present invention is to provide a new and improved illumination kit apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
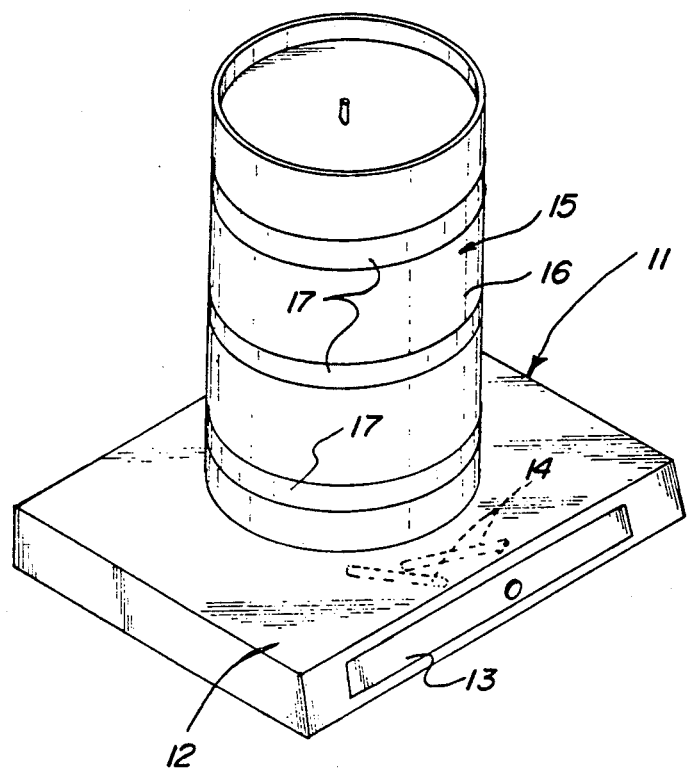
FIG. 1 is an isometric illustration of a candle assembly utilized by the invention.
Figure 2:
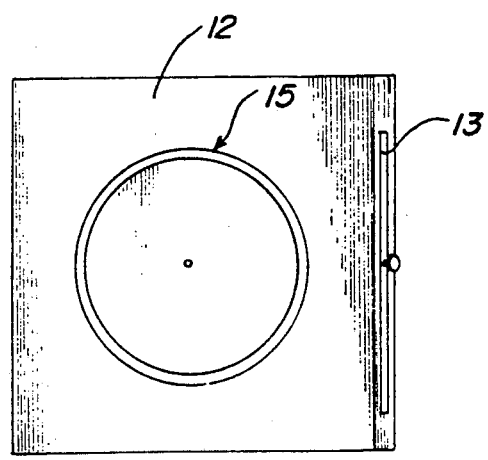
FIG. 2 is an orthographic top view of FIG. 1.

With reference now to the drawings, and in particular to FIGS. 1 to 7 thereof, a new and improved illumination kit apparatus embodying the principles and concepts of the present invention and generally designated by the reference numeral 10 will be described.

More specifically, the illumination kit apparatus 10 of the instant invention essentially comprises at least one, if not a plurality, of candle assemblies 11 utilized by the invention. A candle assembly of a first type as illustrated in FIG. 1 to include a luminescent hollow base 12 mounting a slide drawer 13 therewithin including a plurality of matches 14 and the like therewithin for effecting illumination of the candle structure 15. The candle 15 in turn is mounted orthogonally to the top surface of the hollow base 12. The hollow base accordingly is luminescent and will direct individuals to the hollow base for use of the matches permitting illumination of the candle structure. The candle side wall 16 includes a plurality of luminescent circumferential bands 17 to provide for positioning of the candle relative to the base to effect its positioning during conditions of limited available light, such as in power outages and the like.

Figure 3:
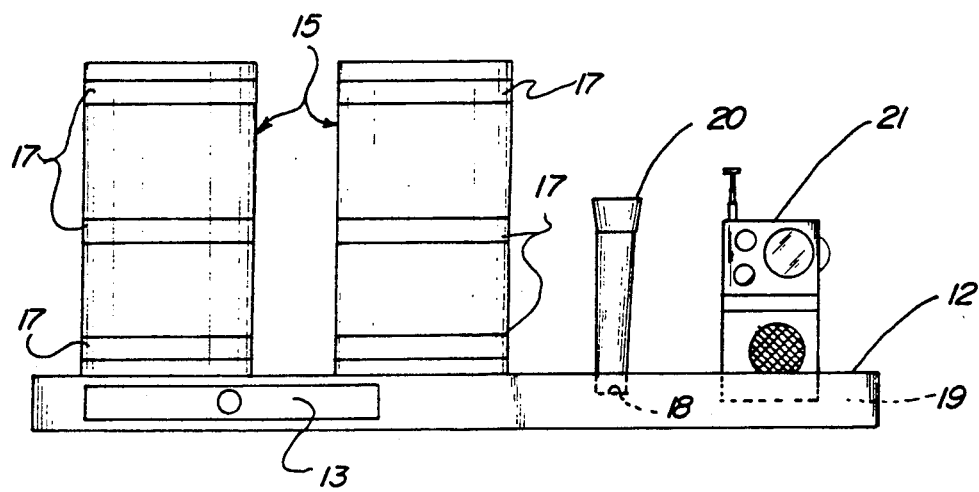
FIG. 3 is an isometric illustration of a modification of the invention.
Figure 4:
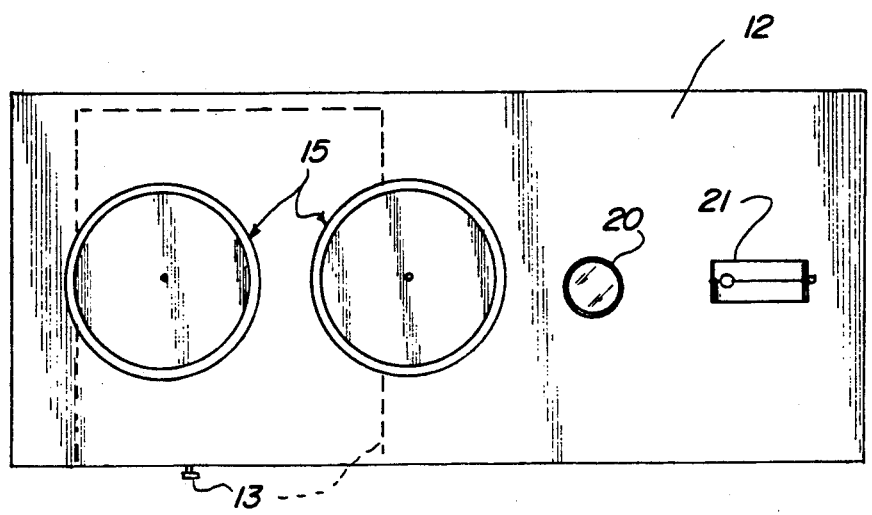
FIG. 4 is an orthographic top view of the invention, as set forth in FIG. 3.
Figure 5:
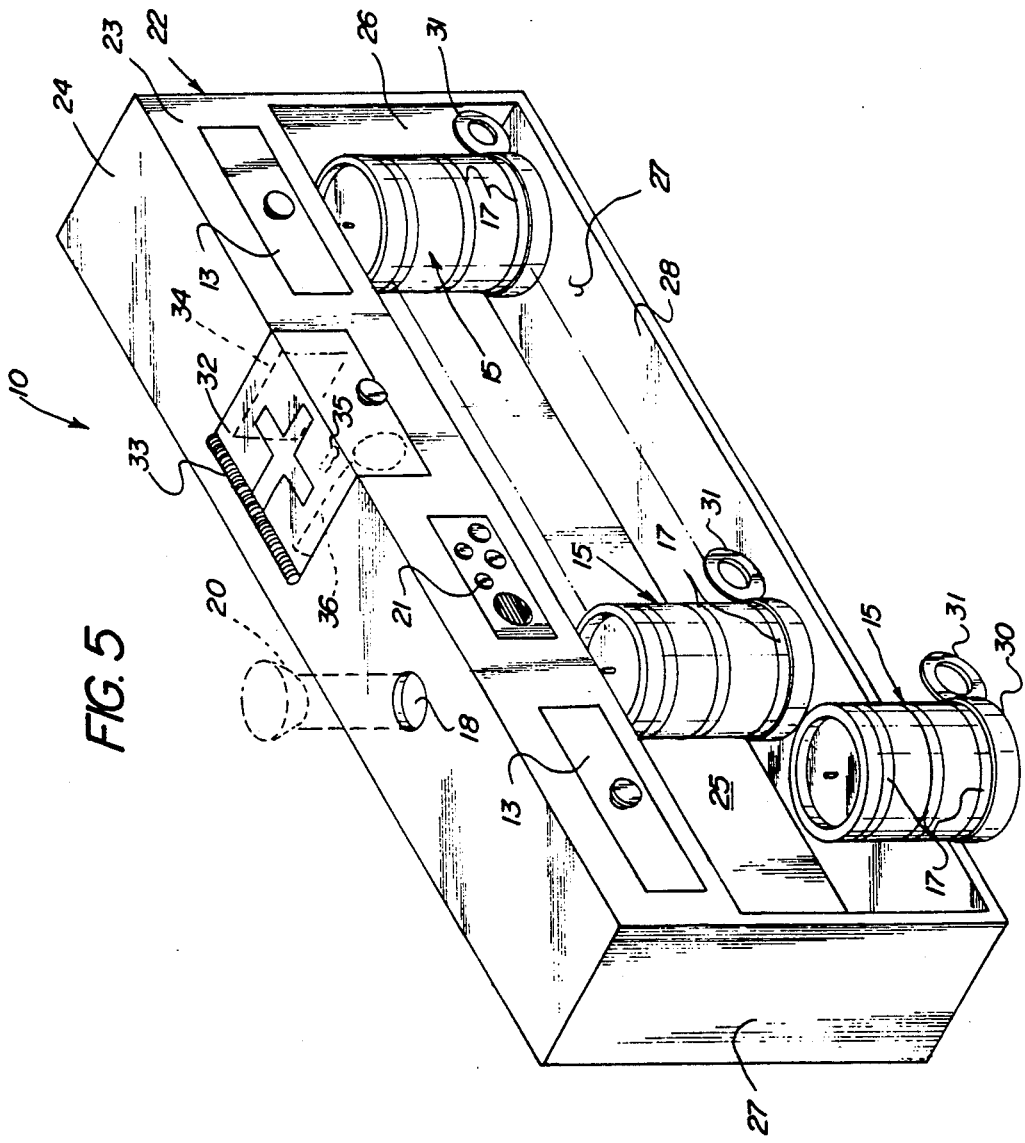
FIG. 5 is an isometric illustration of the invention in a complete configuration.
Figure 6:
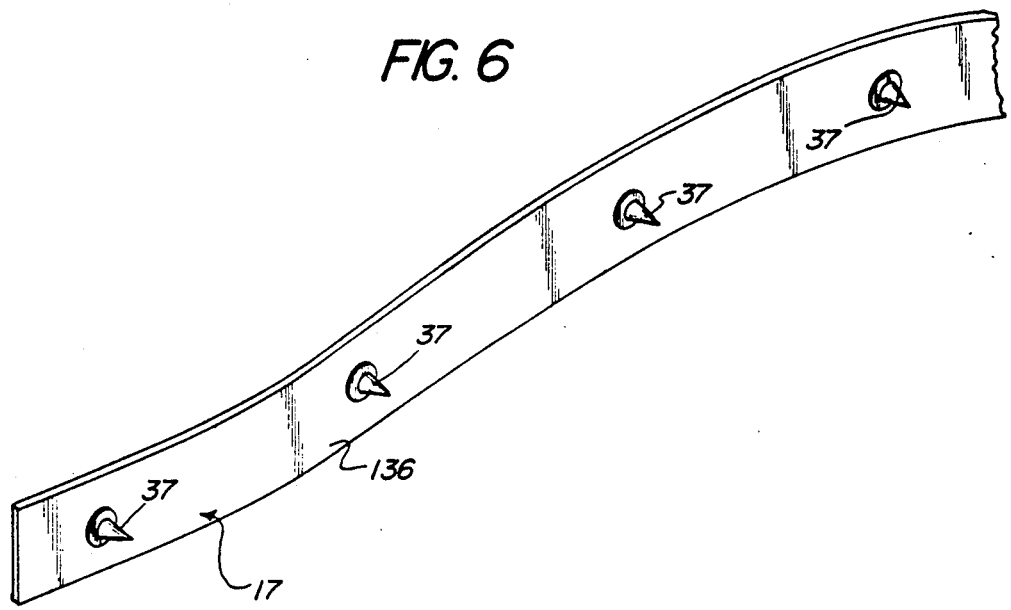
FIG. 6 is an isometric illustration of a single luminescent band utilized by the invention.
Figure 7:
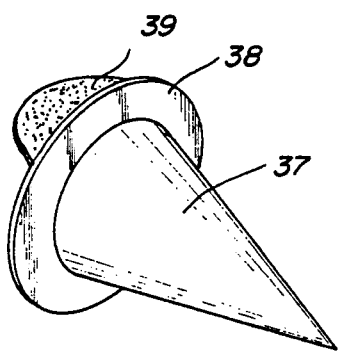
FIG. 7 is an isometric enlarged illustration of individual spike members mounted to the band structure, as set forth in FIG. 6.

The structure of the FIGS. 3 and 4 includes the base 12, including a respective first and second socket 18 and 19 directed into the top surface of the base for removably mounting a flashlight 20 and a radio receiver 21 within the respective first and second sockets 18 and 19 for further use during power outages. The apparatus 10, as illustrated in configuration set forth in FIG. 5, includes the housing 22 formed with a front wall 23, a top wall 24, a rear wall 25, a right wall 26, a left wall 27, and a floor 28. The floor 28 includes a front wall opening 29 directed therethrough positioned below the plurality of slide drawers 13, the radio 21, and an associated "L" shaped top wall lid 32 projecting along the top wall 24 and downwardly along the front wall 23 providing storage therewithin for a first aid compartment and hingedly mounted about a lid hinge 33 along the top wall. Bandages 34, smelling salts 35, antibacterial ointment 36, and the like are contained within the first aid kit for use by the organization. The flashlight socket 18 is mounted through the top wall 24 as illustrated. Candle members 15, as illustrated and removably mounted on the floor 29, each are secured within an associated candle support container 30 fixedly securing at a lower terminal end of each candle 15 therewithin and the candles 15 including the luminescent band 17 to provide for indication of positioning of the candles during conditions of limited available light. The mounting bands 17 are illustrated in FIG. 6 in more detail, wherein a band rear wall 36 includes a plurality of mounting spikes 37 mounted thereon for impaling the spikes 37 into the candle body of each candle 15 to secure the bands thereon permitting their subsequent removal upon illumination of the candle. The plurality of bands in this manner may be sequentially removed depending upon the remaining available effective height of an associated candle. The spikes themselves include a spike base 38, wherein the spike base 38 includes an adhesive 39 mounted coextensively to the rear surface of each spike for securement to the rear wall 36.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An illumination kit apparatus, comprising in combination,
    a housing, the housing including illumination means mounted on the housing for providing for selective illumination, wherein the illumination means includes at least one candle assembly, the candle assembly including a support container, the support container including a candle member contained with the support container extending upwardly thereof, and the candle member including a plurality of circumferential luminescent bands mounted in a spaced relationship about the candle member, and
    the luminescent bands are removable mounted relative to the candle member, and
    the housing includes a front wall, a top wall orthongonally mounted in coextensive relationship to the front wall, a rear wall extending downwardly from the front wall, the rear wall extending below the front wall and fixedly mounted to a floor, and the housing further including a left side wall spaced from a right side wall, the floor spaced below the front wall to define a cavity between the front wall and the floor, and the front wall including a plurality of slide drawers directed through the front wall below the top wall, wherein at least one of the drawer members includes a plurality of matches contained therewithin for effecting actuation of the candle member.

2. An apparatus as set forth in claim 1 wherein a plurality of candle members are mounted on the floor below the front wall, and each candle member is mounted within a support container, each support container including a finger loop mounted on the support container for permitting ease of transport of each candle member relative to the housing, and each candle member including a plurality of said luminescent bands circumferentially mounted about each candle member.

3. An apparatus as set forth in claim 2 wherein the top wall includes a top wall socket, and the top wall socket includes a flashlight member removably mounted within the top wall socket.

4. An apparatus as set forth in claim 3 including an "L" shaped lid hingedly mounted to the top wall extending downwardly along the front wall defining a compartment, wherein the compartment includes a plurality of first aid components to include bandages, smelling salts, and antibacterial ointment.

5. An apparatus as set forth in claim 4 including a radio assembly mounted within the housing directed through the front wall below the top wall.

6. An apparatus as set forth in claim 3 wherein each luminescent band includes a band rear wall for securement against each of said candles, and each bard rear wall includes a plurality of mounting spikes, wherein each mounting spike is arranged for directing into one of said candles.

7. An apparatus as set forth in claim 6 wherein each spike includes a spike base, and each spike base includes an adhesive coextensive with the base, wherein the adhesive is in contiguous communication with the band rear wall for securement of the spike to the band rear wall permitting projection of each of said spikes into a single candle of said candles for securing of said band rear wall to said candle.

* * * * *